UNITED STATES PATENT OFFICE.

ALFRED EMILE MÉRY, OF PARIS, FRANCE.

IMPROVEMENT IN COMPOSITIONS FOR APPLYING COLORS.

Specification forming part of Letters Patent No. 216,207, dated June 3, 1879; application filed November 2, 1878.

*To all whom it may concern:*

Be it known that I, ALFRED EMILE MÉRY, of Paris, France, have invented a new and Improved Compound for Use with Colors Instead of Oil, of which the following is a specification.

My invention consists in the preparation of colors by means of a paste, the composition of which will herein be described, and which imparts to these colors or paints properties fitting them for being substituted for those now in use in the arts and industries.

The paste has the following composition: Glue, twenty-five parts, by weight; glycerine, five hundred and thirty-four parts, by weight; water, two hundred and eight parts, by weight; white wax, (pure,) two hundred and eight parts, by weight; strong solution of ammonia, twelve and one-half parts, by weight; rosin, twelve and one-half parts, by weight. These proportions do not need always to be the same, and I hereby reserve the right to deviate from them as I may deem proper.

When the proper coloring-matters are intimately mixed with this paste they form paints which may be exposed for a considerable length of time without undergoing any apparent change. These colors may be used in the arts and industries in a great many different ways. They are adapted to be used in pastel, aquarel, and oil painting. They may very easily be applied to linen or other fabrics, to glass, in fact to any desirable substance. They may also be used for printing and for decorating porcelain, faience, terra-cotta, pottery, and ceramic goods of all kinds. Their property of rapid drying (the glycerine is, on immersion in water, removed) makes them very valuable to artists taking views from nature.

The following describes the method by which I prepare the paste, which is the principal part of my invention: About two hundred and eight grams of pure white wax are melted and intimately mixed in a water-bath, with two hundred and sixty grams of glycerine. When the wax is completely melted a mixture is gradually added formed by dissolving twelve and one-half grams of rosin in a sufficient quantity of ether. Then, while briskly stirring, the twelve and one-half grams of solution of ammonia are added in small portions at a time. Subsequently a liquid is added, made by dissolving twenty-five grams of fish-glue, gelatine, or any other glue of good quality, in two hundred and sixty grams of glycerine. Into this composition is now poured a larger or smaller quantity of water—two hundred grams, for instance—the whole being then stirred till completely cool.

The paste thus obtained is mixed with the coloring-matters, previously rubbed up with a larger or smaller quantity of glycerine, according to the consistency desired.

The paste described is especially adapted for the reproduction of pastels, oil-paintings, frescoes, and other decorations, and the reproduction will in most cases equal the original.

What I claim as new is—

A compound consisting of glue, glycerine, water, white wax, ammonia, and rosin dissolved in ether, said ingredients being in proportions substantially as described.

ALFRED EMILE MÉRY.

Witnesses:
 AMADEE TAVERNIER,
 THIÉBAÚT PSCHIERET.